Aug. 19, 1952     A. LESAUNIER     2,607,613
MANUALLY PROPELLED FARM TRACTOR DEVICE
Filed Feb. 18, 1950     2 SHEETS—SHEET 1
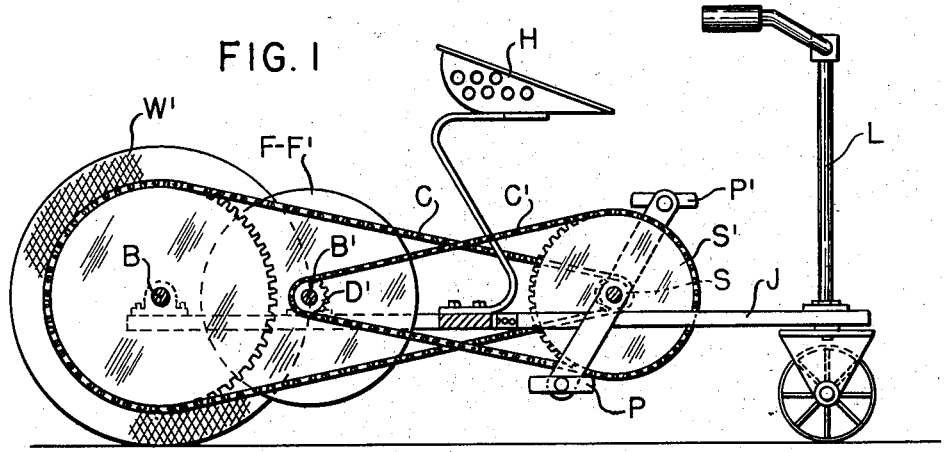
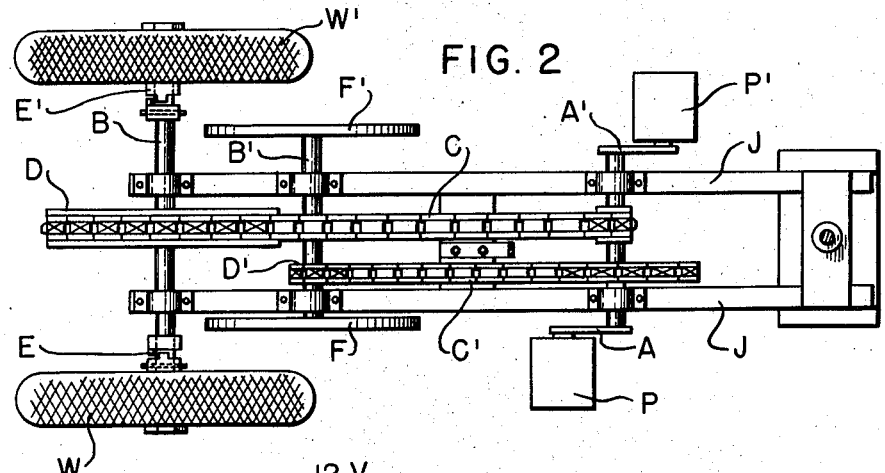
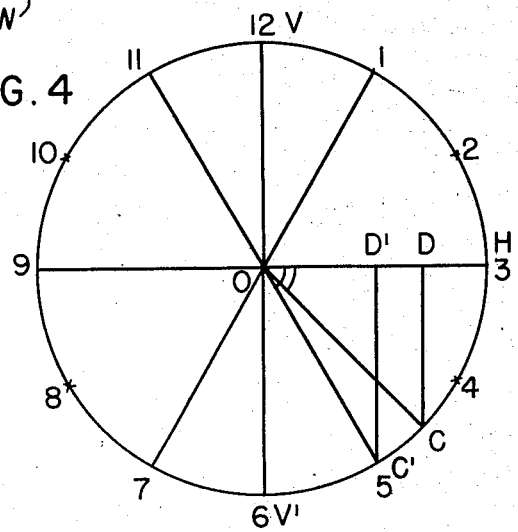
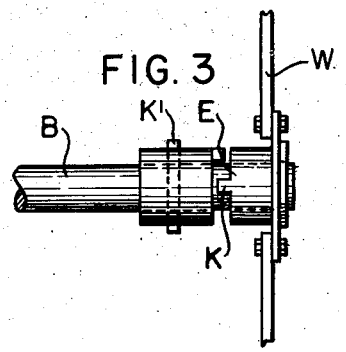
INVENTOR.
Alexandre Lesaunier
BY
ATTORNEY Aug. 19, 1952 A. LESAUNIER 2,607,613
MANUALLY PROPELLED FARM TRACTOR DEVICE
Filed Feb. 18, 1950 2 SHEETS—SHEET 2

*INVENTOR.*
Alexandre Lesaunier
BY

ATTORNEY

Patented Aug. 19, 1952

2,607,613

UNITED STATES PATENT OFFICE 2,607,613

MANUALLY PROPELLED FARM TRACTOR DEVICE

Alexandre Lesaunier, Brooklyn, N. Y.

Application February 18, 1950, Serial No. 144,880

2 Claims. (Cl. 280—217)

This invention relates to tractor devices and more particularly to manually operated tractor devices and has for its object the provision of a manually driven tractor device for use in the cultivation of small farm areas.

Another object is to provide a suitable bicycle drive means for actuating a tractor device.

Still another object is to provide a bicycle-powered tractor device suitable for use in the cultivation of small sized land areas.

Other objects will be apparent as the invention is more fully hereinafter disclosed.

In accordance with these objects I have devised a bicycle-powered tractor device, one specific embodiment of which is illustrated in the accompanying drawings, in which device the power generated on pedal rotation of a drive sprocket is amplified for power on the drive wheels of the device and for speed on an independently mounted fly-wheel, so as to maintain a substantially constant rate of rotation of the pedal rotated sprocket and a substantially constant flow of power to the drive wheels through each 360 degrees of rotation of the drive sprocket.

By this arrangement and a proper selection of gear reduction ratios between the drive and driven sprockets the flow of power from the pedal actuated drive sprocket to the drive wheels may be maintained substantially constant at a power level normally in excess of a determined maximum work load and smooth operation of the tractor device with the minimum application of manpower thereby may be obtained.

Before further disclosure of the invention reference should be made to the accompanying drawings, wherein:

Fig. 1 is a side elevational view of one specific embodiment of the bicycle-powered tractor of the present invention;

Fig. 2 is a top view of the same taken along plane 2—2;

Fig. 3 is an enlarged sectional view illustrating the drive connection between the drive means and the drive wheels of the tractor device;

Fig. 4 is a curve illustrating the power capacity of the device in several different positions of pedal rotation;

Figure 5:
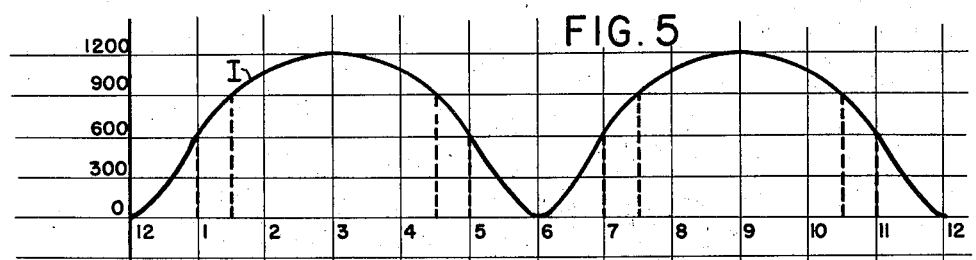
Fig. 5 is the power curve developed in the device on 360° rotation of the drive sprocket without the augmented power developed in the rotating fly-wheel.

As may be noted from Figs. 1 to 3, inclusive, the bicycle-powered tractor device of the present invention consists of a pedal-actuated double sprocket S—S' sustained for pedal rotation on frame J of the tractor device. The front wheel assembly L is of common design and forms no part of the instant invention except as a necessary part of the combination.

Sprocket S is connected by chain drive means C for driving driven sprocket D mounted on drive shaft B rotatively sustained on frame J, and for driving through clutches E—E' the drive wheels W—W' sustained on the ends of the drive shaft B.

Sprocket S' is operatively connected by chain drive means C' to drive driven sprocket D' for rotating the fly-wheels F—F' independently mounted on shaft B' also sustained for rotation on frame J.

The relative sizes of the drive sprockets S—S' and driven sprockets D—D', the length of pedal arms A—A', and the weight and size of fly-wheels F—F' have been mathematically selected to provide a substantially constant flow of power from the drive sprockets S—S' to the driven sprocket D for driving wheels W—W' in forward and reverse direction at a power level which is in excess of the maximum estimated load requirements of the tractor device under average service use conditions during each 360° rotation of the pedal-actuated sprockets S—S'.

It is generally recognized that the normally expected power requirement of a tractor device to work soil of average garden quality should not exceed about 500 pounds. The actual power requirement varies widely with the nature of the soil, the kind of tool operated by the tractor (plow, disc, harrow, etc.), the topography and the moisture condition of the soil, as one skilled in the art will recognize, from considerably less than the estimated normal load of 500 pounds to somewhat more than 500 pounds. The specific embodiment of the tractor device illustrated in the drawings has been designed to provide a substantially constant power in the wheels W—W' that is well in excess of this recognized average power requirement from the weight and energy of a workman of average weight and strength.

To obtain this result, pedal arms A—A' of pedals P—P' each have a length approximating seven times the radius of the drive sprocket S and the diameter of driven sprocket D is approximately seven times the diameter of the drive sprocket S. Drive sprocket S' has a diameter seven times that of driven sprocket D'. Accordingly with each 360° rotation of drive sprockets S—S' the driven sprockets D—D' will rotate one-seventh revolution and seven revolutions, respectively. Thus power is applied to sprocket D and speed is applied to sprocket D' upon pedal rotation of double sprockets S—S' at the same rate and with the same force.

Sprockets S—S' and D—D' are each provided with 14 teeth at a pitch diameter of 2.247 inches and the chains C—C' are each roller chains having ½ inch pitch. Accordingly, for each revolution of the sprockets S—S' the chain C travels 14 times the pitch of the chains or seven inches.

At different rates of revolution per minute of the sprockets S—S' by pedals P—P' the chain C will have the following corresponding speeds:

10 R. P. M. 7×10=70″ or 5′10″
20 R. P. M. 7×20=140″ or 11′8″
30 R. P. M. 7×30=210″ or 17′½″

The wheels W—W' of the tractor are designed to be ⅓ larger than the sprocket D. The speed of the tractor therefore will be ⅓ more than the speed of chain C. The speed of the tractor at the above specified rates of revolutions per minute of the sprockets S—S' will be as follows:

10 R. P. M. $\frac{70'' \times 3}{2} = 105''$ or 8′9″

20 R. P. M. $\frac{140'' \times 3}{2} = 210''$ or 17′½″

30 R. P. M. $\frac{210'' \times 3}{2} = 315''$ or 26′3″

While the power on the tractor wheels W—W' will also be reduced by ⅓, due to the increase in the size of the wheels W—W' over that of the sprocket D, sufficient power is initially available from the drive sprockets S—S'.

The energy developed in the rotating fly-wheels F—F' rotating at between 140 to 175 R. P. M. can be used as a power take-off for running a cutter bar or a lawn mower, if desired.

For starting and reversing the tractor device of the present invention a means E—E' is provided for delaying engagement of the driven shaft with the wheels W—W' until maximum power is available for moving the same.

As shown in enlarged view Fig. 3, a key K is provided on the shaft of each of the tractor wheels W—W' and the drive shaft rotated by the driven sprocket D is provided with a key K'. The wheels W—W' cannot rotate in either direction until the key K' is rotated to a position where it engages with the key K. This requires 6 or 7 revolutions of the drive sprockets S—S' during which the fly-wheels F—F' are being rotated at a high speed to build up energy amplifying the power on the driven sprocket D. The fly-wheels F—F' normally are rotated more than 40 revolutions by the time the keys K—K' are rotated into engaging position and the momentum of the fly-wheels F—F' plus the power coming from the weight of the operator acting now on the driving chain C will provide the required maximum power for starting the tractor into forward or reverse motion.

The particular size and weight of the fly-wheels F—F' may be widely varied without essential departure from the present invention, depending upon how much or how little added power is desired therefrom and a satisfactory size and weight has been found to be that provided by a steel disc of about 1 inch thickness and 16 inches in diameter.

Referring now to the curve of Fig. 4, the power available on the chain C is indicated where any operator weighing 170 pounds, for example, is actuating the pedals P—P'. As indicated above, the ratio between sprockets S' and D with the diameter of the circumference made by pedal being of 7 to 1, the power on the chain C will be 170 lbs.×7=1190 lbs. or about 1200 lbs. when the pedals P—P' are in the horizontal position.

When pedals P—P' are in the vertical position the pull power on the chain C will be zero. The power on chain C will be ¾ of the maximum power, that is 900 lbs., when the lever arm A—A' of the pedals P—P' are in position OD (about ¾ of OH). At this moment the arms A—A' will be in the position OC (on the curve of Fig. 5), C being at an equal distance between H and V¹, and the angle HOC will be 45° (this is not exactly correct when C is at half distance between H and V¹, OD equals one-half of the side of the square inscribed in the circle, that is exactly $$\sqrt{\frac{OC_2}{2}}$$

or very close to ¾). When the arms A—A' of the pedals P—P' are at C, half the distance between H and V¹, the power on the chain C is close to ¾ of 1200 lbs. or about 900 lbs.

When the lever arms A—A' of the pedals P—P' are in OD¹ (half of OH), the power is half of 1200 lbs. or 600 lbs.; triangle HOC' is equilateral, angle HOC'=60° or ⅔ of 90°, C' is at ⅔ between H and V¹ and the power on chain C is still half of the maximum.

If the circumference of the circle of Fig. 4 is divided in 12 parts and the said parts are put on a horizontal line, and the power is indicated on the vertical at each point, we will obtain the power curve shown in Fig. 5. This curve represents the power on the chain C in one complete revolution of the drive sprockets S—S' when the fly-wheels F—F' are considered non-existent. It is obvious that the power working on a chain and a shaft running at low speed must have a poor efficiency, with a great part of the power being in excess at certain times and with no reserve power available when the power is zero. A fly-wheel mounted on the driving shaft, as heretofore employed, running at the same low speed as the shaft would have very little effect in correcting the variable power on chain C. However, by mounting the fly-wheels F—F' on a separate shaft and operatively connecting the same to the sprockets S—S' for high speed rotation, the energy of the flywheels is available for increasing the efficiency of the system as the power falls to zero. This is the essential mechanical principle of the present invention, the fly-wheels F—F' mounted on a separate shaft B' and operatively connected by chain C' for independent high speed rotation to build up energy overcoming the zero power positions of the pedal-actuated double sprockets S—S'.

Figure 6:
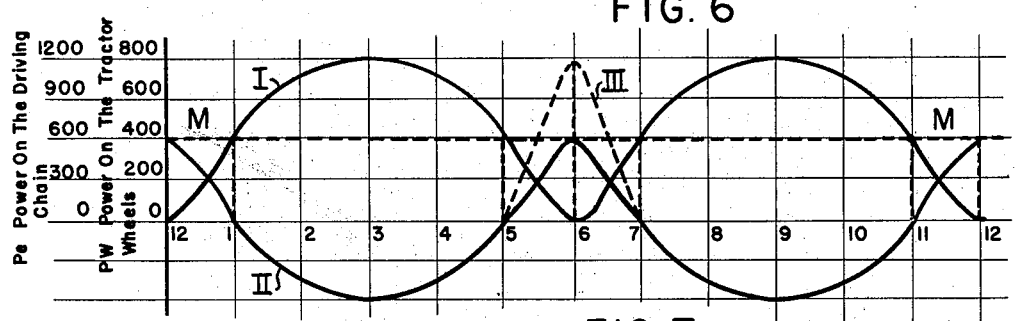
Fig. 6 is the power curve developed with the fly-wheel power added under one load condition.
Figure 7:
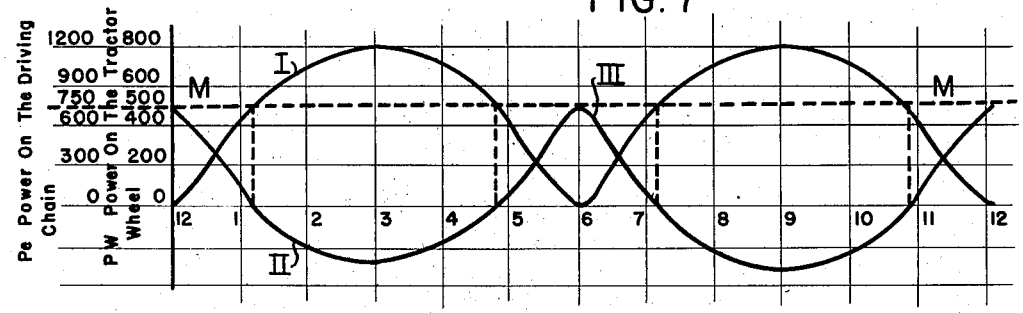
Fig. 7 is the power curve developed with the fly-wheel power added under a second load condition.
Figure 8:
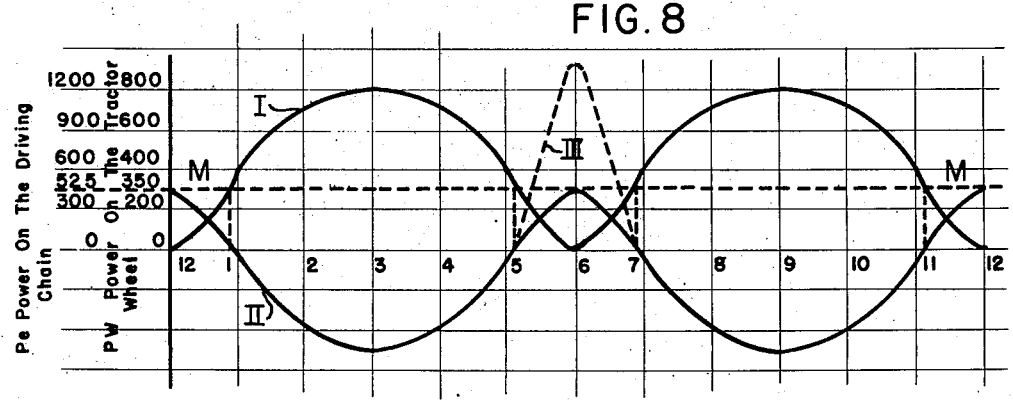
Fig. 8 is the power curve developed with the fly-wheel power added under a third load condition.

The effect of the fly-wheels F—F' on the power curve shown in the curve of Fig. 5 is indicated in Figs. 6, 7 and 8 under three assumed operating conditions. In the curves of Figs. 6, 7 and 8 it must be recognized that the power on the driving chain C is ⅓ higher than the power on the tractor wheels W—W', because the diameter of the tractor wheels is ⅓ more than the diameter of the driven sprocket D and that this loss in power is compensated for by a corresponding gain in speed of ⅓ on the wheels W—W'.

Where $Pc$ equals the power on the driving chain C and $Pw$ equals the power on the wheels W—W', then $$Pw = \frac{2}{3} Pc$$

or $$Pc = \frac{3}{2} Pw$$

If $Pg$ equals the power for working the ground (estimated before around 300 lbs.) and $Pt$ equals the power for driving the tractor alone (estimated before at around 100 lbs.) then $Pw$ equals $Pg + Pc = 300 + 100 = 400$ lbs.

Referring now to the curve Fig. 6, the power necessary to do a certain work is 400 lbs. (300 lbs. for the work on the ground, 100 lbs. for running the tractor alone making a power of 400 lbs. on the tractor wheels). Under the conditions given above the power on the driving chain equals 600 lbs. In this case the power will be represented by line M—M parallel to the horizontal zero line (0) at 600–400 lbs. and the curve indicates the power available at every point of the circumference described by pedals P—P' during the rotation of sprockets S—S' by the operator.

As described above the fly-wheels F—F' are rotated more than 40 revolutions before the key K on the driving shaft comes in contact with the key K' on the hub of the driving wheels W—W', and the momentum of the fly-wheels furnish the required additional power for starting the tractor device in forward or reverse motion. If it be supposed that the pedals P—P' are at dead center at the top and bottom (positions 12 and 6 of the curve of Fig. 4) at this moment no power is being furnished from the pedals and all the power for running the tractor will come from the fly-wheels F—F' until the pedals P—P' move beyond this position. The power from the pedals P—P' then builds up to a peak power which is in excess of the power required for running the tractor in opposition to the fixed load of 400 lbs. and the fly-wheels F—F' will absorb this excess of power as this excess power gradually increases until the pedal position 3 is reached. This excess power will decrease after the pedal passes position 3 until position 6 is reached. The curve II of Fig. 6 below the zero line will be symmetrical to the curve I above the M—M line over the other half of the 360° angle of rotation of pedals P—P'.

The power from the pedals P—P' being less than the power required for running the tractor between positions 5 and 6, the momentum of the fly-wheels F—F' will now supplement the power on the pedals P—P' until pedal rotation has carried the pedals P—P' to a position where the other foot of the operator can take over to move the upper pedals P—P' from 12 to 6.

Thus it can be seen that the absorption of power in fly-wheels F—F' is done between pedal positions 1 and 5, 7 and 11, and power supplementing is done between pedal positions 5 and 7, 11 and 1. Accordingly the fly-wheels F—F' absorb more power in 4/12 of the pedal revolution, than they deliver in 2/12 of the pedal revolution. In practice, the fly-wheels F—F' should restore the same amount of power absorbed (if the efficiency of the engine is 100%) and the curve between pedal positions 5 and 7 should be higher than shown in curve section III in Fig. 6. In fact, having to supply power in half the time the power is absorbed, this power available in fly-wheels F—F' should be double that required for this half time for smooth operation.

Referring now to the curve of Fig. 7, the power necessary to do a certain piece of work is assumed to be 500 lbs. (400 lbs. for the work of the ground and 100 lbs. for running the tractor alone making a total of 500 lbs.) on the tractor wheel or 750 lbs. on the driving chain where the weight of the operator is 170 lbs. and the drive reduction is 7 to 1 as assumed in the example of Fig. 6.

Under these conditions horizontal line M—M now is shown raised to the level 500–750. The points where curve II will cross the zero line (0) corresponding to the intersection of M—M with curve I, are found as before given. The absorption of power by the fly-wheels F—F' is represented by the part of curve I above M—M. This absorption is reduced and shown symmetrically by curve II under the zero line. The period of absorption has decreased while the period of restoring power has increased. There is no excess power available but the tractor will continue to run anyhow. The operator still furnishes the same power on chain C through the pedals P—P' but the speed will be reduced. When the resistance of the ground or the load decreases, the speed of the tractor will increase until normal speed is reached for the power required for the load encountered.

Referring now to the curve of Fig. 8, the power necessary to do a certain work is assumed to be less than 400 lbs. This is the normal expected load condition at which the tractor will generally run. This normal load condition is estimated at around 250 lbs. (for working the soil) and 100 lbs. (for running the tractor itself) making a total of 350 lbs. Curve II is obtained from curve I by the same process as above described and line M—M is located at 350–525 lbs. The absorption of power by the flywheel F—F' is much greater than shown in the curve of Fig. 6, and power absorption initiates before the pedals move to positions 1 and 7 and finishes after the pedals are moved to positions 5 and 11. The period of power restoration is represented by curve section III, having a peak well above the maximum power of 800–1200 lbs. As in the curve of Fig. 6, but with more amplification, the restoration of the excess power by the fly-wheels F—F' will permit the speed of the tractor to be materially increased.

In all of these assumed conditions represented by the curves of Figs. 6 to 8, the efficiency of the tractor in the transmission of power is presumed to be 100%. It is evident that this efficiency will depend on the mounting of the chains, gears, roller bearings and on the maintenance of these parts in clean condition. All these parts should run in oil in a completely enclosed box so that an efficiency of 90% or more can be expected, as one skilled in the art will recognize.

As indicated in the above disclosure, by means of independently mounted fly-wheels F—F' operatively connected to the double drive sprocket S—S' for rotation at a relatively high speed with pedal rotation of the sprockets S—S', the rotation of driven sprocket D at low speed under load conditions is smoothed out at all rotated positions of the pedals P—P' and under all conditions of load resistance up to the maximum load for which the device is designed.

In general, the operator under low and medium load conditions can remain seated on the seat H of the device, rotating the pedals P—P' by muscular power only. At higher load conditions than this it may be necessary for the operator to apply his full weight alternately onto the pedals P—P' to rotate the same, in which case the energy developed in the high speed fly-wheels F—F' may be relied on to carry the pedals P—P' passed the dead spots at positions 12 and 6 respectively (curve Fig. 5).

It is believed apparent from the above disclosure that many modifications and departures may be made in the above described specific embodiment of the invention without essential departure therefrom or from the generic scope of the present invention and all such departures and improvements are contemplated as may fall within the scope of the following claims.

What I claim is:

1. A pedal actuated tractor comprising a frame having horizontal side bars, a driven shaft rotatably mounted across rear portions of said side bars with end portions projecting outwardly therefrom, wheels having hubs rotatable about end portions of said shaft and each provided with an abutment projecting from its inner end, collars about said shaft inwardly of the wheels each having an abutment projecting toward the companion wheel in position for engaging the abutment thereof and turning the wheel with the shaft, a drive shaft rotatably mounted across forward portions of the side bars, arms at ends of said drive shaft extending radially therefrom in opposite directions and carrying pedals at their outer ends, an idler shaft rotatably mounted across said side bars between the drive shaft and the driven shaft, flywheels carried by said idler shaft outwardly of the side bars, a large sprocket wheel mounted upon said driven shaft between the side bars, a small sprocket wheel mounted upon said drive shaft between the side bars, a sprocket chain trained about the sprocket wheels, a sprocket wheel mounted upon the drive shaft, a small sprocket wheel mounted upon said idler shaft, and a sprocket chain trained about the last mentioned sprocket wheels.

2. A pedal actuated tractor comprising a horizontal frame, a driven shaft rotatably mounted across said frame with end portions projecting from opposite sides thereof, wheels loose upon the end portions of said shaft, companion lost motion members carried by said shaft and the wheels for turning the wheels with the shaft, a drive shaft rotatably mounted cross said frame forwardly of said driven shaft, arms for said driven shaft carrying pedals, an idler shaft rotatably mounted across said frame between and in spaced relation to the drive shaft and the driven shaft, flywheels mounted upon ends of said idler shaft, a large sprocket wheel mounted upon said driven shaft, small sprocket wheels mounted upon the drive shaft and the idler shaft, a sprocket chain trained about the small sprocket wheel on the drive shaft and the large sprocket wheel on the driven shaft, a large sprocket wheel on the drive shaft of less size than the large sprocket wheel on the driven shaft, and a sprocket chain trained about the small sprocket wheel on the idler shaft and the large sprocket wheel on the drive shaft.

ALEXANDRE LESAUNIER.

REFERENCES CITED

The following references are of record in the file of this patent:

UNITED STATES PATENTS

| Number | Name | Date |
|---|---|---|
| 841,239 | Fouts | Jan. 15, 1907 |
| 1,351,782 | Mitchell | Sept. 7, 1920 |

FOREIGN PATENTS

| Number | Country | Date |
|---|---|---|
| 441,310 | France | May 23, 1912 |